United States Patent
Lim et al.

(10) Patent No.: US 9,251,604 B2
(45) Date of Patent: Feb. 2, 2016

(54) APPARATUS AND METHOD FOR GENERATING TOMOGRAPHY IMAGE

(71) Applicants: Samsung Electronics Co., Ltd., Suwon-si (KR); Korea Advanced Institute of Science and Technology, Daejeon (KR)

(72) Inventors: Jae-guyn Lim, Seongnam-si (KR); YongKeun Park, Daejeon (KR); Jae-duck Jang, Daejeon (KR); Seong-deok Lee, Seongnam-si (KR); Woo-young Jang, Seongnam-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 164 days.

(21) Appl. No.: 13/946,833

(22) Filed: Jul. 19, 2013

(65) Prior Publication Data
US 2014/0023255 A1    Jan. 23, 2014

Related U.S. Application Data

(60) Provisional application No. 61/673,989, filed on Jul. 20, 2012.

(30) Foreign Application Priority Data

Jun. 17, 2013 (KR) .................. 10-2013-0069201

(51) Int. Cl.
*G06T 11/00* (2006.01)
(52) U.S. Cl.
CPC ............ *G06T 11/003* (2013.01); *G06T 11/005* (2013.01)

(58) Field of Classification Search
None
See application file for complete search history.

(56) References Cited

U.S. PATENT DOCUMENTS

2005/0254709 A1 * 11/2005 Geshwind et al. ............ 382/182
2007/0014464 A1     1/2007 Ohashi
(Continued)

FOREIGN PATENT DOCUMENTS

| KR | 10-2004-0039139 A | 5/2004 |
| KR | 10-2006-0082204 A | 7/2006 |

(Continued)

OTHER PUBLICATIONS

Szkulmowski, Maciej, et al. "Efficient reduction of speckle noise in Optical Coherence Tomography." Optics express 20.2 (2012): 1337-1359.*

(Continued)

*Primary Examiner* — Vikkram Bali
*Assistant Examiner* — Tracy Mangialaschi
(74) *Attorney, Agent, or Firm* — NSIP Law

(57) ABSTRACT

A method of generating a tomography image includes performing a depth scan on one spot on a surface of a subject using modulated light received from a spatial light modulator, obtaining depth scan data for each of a plurality of patterns of the spatial light modulator by repeating the depth scan on the spot for each of the plurality of patterns, forming a matrix R representing a vector space based on a correlation of signal values of the depth scan data for each of the plurality of patterns, performing a matrix decomposition on the matrix R, dividing the vector space into a noise subspace and a signal subspace based on a matrix obtained by the matrix decomposition, constructing a vector space based on either one or both of components of the signal subspace and components of the noise subspace, and generating a tomography image based on the reconstructed vector space.

21 Claims, 4 Drawing Sheets

(56) References Cited

U.S. PATENT DOCUMENTS

| | | | |
|---|---|---|---|
| 2007/0066895 A1* | 3/2007 | Sikdar et al. | 600/437 |
| 2008/0002211 A1 | 1/2008 | Park et al. | |
| 2008/0117430 A1 | 5/2008 | Terakawa et al. | |
| 2009/0263001 A1 | 10/2009 | Ding et al. | |

FOREIGN PATENT DOCUMENTS

| | | |
|---|---|---|
| KR | 10-2008-0051546 A | 6/2008 |
| KR | 10-2010-0103188 A | 9/2010 |

OTHER PUBLICATIONS

Marengo, Edwin A., Ronald D. Hernandez, and Hanoch Lev-Ari. "Intensity-only signal-subspace-based imaging." JOSA A 24.11 (2007): 3619-3635.*

I. Vellekoop et al., "Phase control algorithms for focusing light through turbid media," *Optics Communications*, vol. 281, No. 11, Jun. 1, 2008, pp. 3071-3080, http://dx.doi.org/10.1016/j.optcom.2008.02.022.

S. Popoff et al., "Measuring the Transmission Matrix in Optics: An Approach to the Study and Control of Light Propagation in Disordered Media," *Physical Review Letters*, vol. 104, No. 10, 100601, week ending Mar. 12, 2010, published Mar. 8, 2010, pp. 100601-1 to 100601-4, http://dx.doi.org/10.1103/PhysRevLett.104.100601.

S. Popoff et al., "Image Transmission Through an Opaque Material," *Nature Communications*, vol. 1, No. 6, Sep. 2010, Article 81, pp. 1-7, published online Sep. 21, 2010, http://dx.doi.org/10.1038/ncomms1078, available at arXiv:1005.0532v2 [physics.optics], Sep. 23, 2010.

T. Hillman et al., "A Reflection-Mode Configuration for Enhanced Light Delivery through Turbidity," *Proceedings of SPIE*, vol. 8227, Feb. 9, 2012, pp. 82271T-1 to 82271T-6, http://dx.doi.org/10.1117/12.909735, Three-Dimensional and Multidimensional Microscopy: Image Acquisition and Processing XIX, San Francisco, Jan. 21, 2012.

W. Nugroho et al., "Basic Characteristics of Interference Image Obtained Using Spatially Phase-Modulated Mirror Array," *Optical Review*, vol. 18, No. 2, Mar./Apr. 2011, pp. 247-252.

M. Szkulmowski et al., "Efficient reduction of speckle noise in Optical Coherence Tomography," *Optics Express*, vol. 20, No. 2, Jan. 16, 2012, pp. 1337-1359, first published on Jan. 6, 2012.

Extended European Search Report issued on Nov. 18, 2013, in counterpart European Application No. 13177430.9 (7 pages, in English).

* cited by examiner

APPARATUS AND METHOD FOR GENERATING TOMOGRAPHY IMAGE

CROSS-REFERENCE TO RELATED APPLICATIONS

This application claims the benefit of U.S. Provisional Application No. 61/673,989 filed on Jul. 20, 2012, and Korean Patent Application No. 10-2013-0069201 filed on Jun. 17, 2013, in the Korean Intellectual Property Office, the disclosures of which are incorporated herein by reference in their entirety for all purposes.

BACKGROUND

1. Field

This application relates to methods and apparatuses for generating a tomography image using light.

2. Description of Related Art

Light is currently being used in various fields. In the biological and medical fields, light is used to observe tissues or cells, diagnose disease, or perform laser surgery in various ways.

By using various characteristics of light, such as monochromaticity, coherence, and directionality, it is possible to capture high-resolution images of living tissues or cells, and thus observe the internal structures of human bodies and living bodies non-invasively. The high-resolution images make it possible to identify the cause, location, and progression of various kinds of disease in the medical field. The high-resolution images include tomography images of human bodies or living bodies captured using light that penetrates into the human bodies and living bodies.

SUMMARY

In one general aspect, a method of generating a tomography image includes performing a depth scan on one spot on a surface of a subject using modulated light received from a spatial light modulator configured to modulate either one or both an intensity and a phase light received from a light source according to a pattern for each of a plurality of patterns; obtaining depth scan data for each of the plurality of patterns by repeating the depth scan on the spot for each of a plurality of patterns of the spatial light modulator; forming a matrix R representing a vector space based on a correlation of signal values of the depth scan data for each of the plurality of patterns; performing a matrix decomposition on the matrix R; dividing the vector space represented as a sum of subspace components into a noise subspace and a signal subspace based on a matrix obtained by the matrix decomposition; reconstructing a vector space based on either one or both of components of the signal subspace and components of the noise subspace; and generating a tomography image based on the reconstructed vector space.

The dividing of the vector space may include determining a threshold based on characteristics of the subspace components or noise levels of the signal values; and dividing the vector space into the noise subspace and the signal subspace based on the threshold and the matrix obtained by the matrix decomposition.

The reconstructing of the vector space may include reconstructing the vector space based only on the components of the signal subspace.

The reconstructing of the vector space may include calculating a multiple signal classification (MUSIC) spectrum based on the components of the noise subspace; and reconstructing the vector space based on the calculated MUSIC spectrum.

The matrix R may be a covariance matrix of signal values of the depth scan data for each of the plurality of patterns.

The performing of the matrix decomposition on the matrix R may include performing an eigenvalue decomposition or a singular value decomposition on the matrix R.

The performing of the matrix decomposition on the matrix R may include performing an eigenvalue decomposition on the matrix R; and the dividing of the vector space may include ranking eigenvalues of an eigenvalue matrix obtained by the eigenvalue decomposition in size order, the eigenvalues of the eigenvalue matrix corresponding to eigenvectors of an eigenvector matrix; and dividing the ranked eigenvalues based on a threshold to divide the vector space into the noise subspace and the signal subspace.

The performing of the matrix decomposition on the matrix R may include performing a singular value decomposition on the matrix R; and the dividing of the vector space may include ranking singular values of a singular value matrix obtained by the matrix decomposition in size order, the singular values of the singular value matrix corresponding to singular vectors of a singular vector matrix; and dividing the ranked singular values based on a threshold to divide the vector space into the noise subspace and the signal subspace.

The plurality of patterns may be uncorrelated with each other.

The plurality of patterns may be determined based on permutations of a Hadamard pattern.

The spatial light modulator may include a digital micromirror device (DMD), or a deformable mirror (DM) device, or a Liquid Crystal on Silicon (LCoS) device.

The method may be an optical coherent tomography (OCT) method or a optical coherent microscopy (OCM) method.

In another general aspect, a non-transitory computer-readable storage medium stores a computer program for controlling a computer to perform the method described above.

In another general aspect, an apparatus for generating a tomography image includes a light source configured to emit light; a spatial light modulator configured to modulate either one or both of an intensity and a phase of the light emitted from the light source according to a pattern; a modulation controller configured to sequentially apply each of a plurality of patterns to the spatial light modulator; a depth scanner configured to perform a depth scan on one spot on a surface of a subject using modulated light received from the spatial light modulator, repeat the depth scan on the spot for each of the plurality of patterns of the spatial light modulator, and obtain light produced by the depth scan for each of the plurality of patterns; a data detector configured to detect depth scan data for each of the plurality of patterns from the light produced by the depth scan for each of the plurality of patterns obtained by the depth scanner; a signal processor configured to form a matrix R representing a vector space based on a correlation of signal values of the depth scan data for each of the plurality of patterns, perform a matrix decomposition on the matrix R, divide the vector space represented as a sum of subspace components into a noise subspace and a signal subspace based on a matrix obtained by the matrix decomposition, and reconstruct a vector space based on either one or both of components of the signal subspace and components of the noise subspace; and an image generator configured to generate a tomography image corresponding to the spot based on the reconstructed vector space.

The signal processor may be further configured to determine a threshold based on characteristics of the components of the subspace or noise levels of the signal values; and divide the vector space into the noise subspace and the signal subspace based on the threshold and the matrix obtained by the matrix decomposition.

The matrix R may be a covariance matrix of signal values of the depth scan data for each of the plurality of patterns.

The signal processor may be further configured to perform an eigenvalue decomposition or a singular value decomposition as the matrix decomposition on the matrix R.

The signal processor may be further configured to calculate a multiple signal classification (MUSIC) spectrum based on components of the noise subspace; and reconstruct the vector space based on the calculated MUSIC spectrum.

The plurality of patterns may be uncorrelated with each other.

The apparatus may further include a light controller configured to horizontally move a location of the spot on the surface on the subject on which the depth scan is performed; the depth scanner may be further configured to repeat the depth scan for each of the plurality of patterns on the moved spot; the data detector may be further configured to obtain depth scan data for the plurality of patterns for the moved spot; the signal processor may be further configured to reconstruct a vector space for the moved spot; and the image generator may be further configured to generate a tomography image corresponding to the moved spot based on the reconstructed vector space, and generate a final tomography image of a region corresponding to all of the spots at which the depth scan was performed by combining the tomography images corresponding to all of the spots.

In another general aspect, a method of generating a tomography image includes generating a reference light and a measuring light from light emitted from a light source; modulating any one of the light emitted from the light source, the reference light, and the measuring light with a spatial modulator configured to modulate either one or both of an intensity and a phase of light according to a pattern for each of a plurality of patterns; performing a depth scan on one spot on a surface of a subject by applying the measuring light to the spot and receiving a response light from the spot; repeating the depth scan for each of the plurality of patterns; obtaining interference light produced by interference of the reference light and the response light; obtaining depth scan data for each of the plurality of patterns based on the interference light; forming a matrix R representing a vector space based on a correlation of signal values of the depth scan data for each of the plurality of patterns; performing a matrix decomposition on the matrix R; dividing the vector space represented as a sum of subspace components into a noise subspace and a signal subspace based on a matrix obtained by the matrix decomposition; reconstructing a vector space based on either one or both of components of the signal subspace and components of the noise subspace; and generating a tomography image based on the reconstructed vector space.

Other features and aspects will be apparent from the following detailed description, the drawings, and the claims.

DETAILED DESCRIPTION

Figure 1:
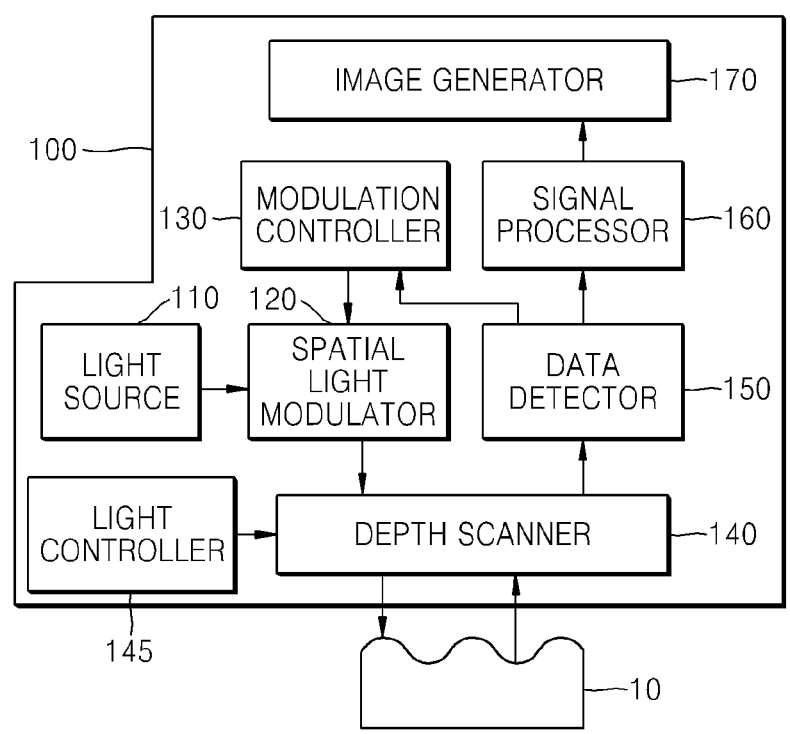
FIG. 1 is a block diagram illustrating an example of an apparatus for generating tomography images.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 is a block diagram illustrating an example of an apparatus for generating tomography images. Referring to FIG. 1, the tomography image generating apparatus 100 includes a light source 110, a spatial light modulator 120, a modulation controller 130, a depth scanner 140, a data detector 150, a signal processor 160, and an image generator 170.

The tomography image generating apparatus 100 illustrated in FIG. 1 includes only components associated with this example to avoid obscuring the features of this example. It will be apparent to one of ordinary skill in the art that other components besides the components illustrated in FIG. 1 may also be included in the tomography image generating apparatus 100.

The tomography image generating apparatus 100 is an apparatus for obtaining tomography images of a subject using light, and includes all optical image apparatuses that may obtain tomography images based on optical coherency, such as an optical coherence tomography (OCT) apparatus, an optical coherent microscopy (OCM) apparatus, and an optical microscope.

The light source 110 emits light. For example, the light source 110 may emit wavelength-swept light or laser light, but is not limited thereto.

The spatial light modulator 120 modulates either one or both of the intensity and the phase of the emitted from the light source 110 light according to a pattern. The spatial light modulator modulates the light emitted from the light source 110 to have either one or both of different intensities and different phases according to the pattern. For example, the spatial light modulator 120 may include a plurality of pixels. The spatial light modulator 120 may modulate the either one or both of the intensity and the phase of the light emitted from the light source 110 according to a pattern in which the pixels are arranged. The spatial light modulator 120 may be a digital micromirror device (DMD). The DMD includes micromirrors reflecting incident light, controls an on/off operation of each of the micromirrors, and forms patterns according to the arrangement of the on/off pixels. However, the spatial light modulator 120 is not limited to a DMD, but may be, for example, a deformable mirror (DM) device or a Liquid Crystal on Silicon (LCoS) device.

The modulation controller 130 sequentially applies each of a plurality of patterns to the spatial light modulator 120. Also, the modulation controller 130 may determine a plurality of uncorrelated patterns of the spatial light modulator 120.

For example, the modulation controller 130 may determine the plurality of patterns so that the plurality of patterns are uncorrelated with each other with respect to phase modulation of the light emitted from the light source 110. In one example, the modulation controller 130 may determine the plurality of uncorrelated patterns so that the plurality of uncorrelated patterns are orthogonal to each other. In another example, the modulation controller 130 may determine the plurality of uncorrelated patterns so that the plurality of uncorrelated patterns are based on permutations of a Hadamard pattern.

The modulation controller 130 may perform spatial shift modulation on some patterns to obtain a plurality of patterns. Spatial shift modulation shifts the on/off arrangement of pixels by a certain number of pixels vertically or horizontally with respect to one pattern that is formed by the on/off arrangement of pixels to obtain a plurality of shifted patterns.

For example, the modulation controller 130 may perform vertical spatial shift modulation by shifting one pattern by various numbers of pixels vertically to obtain vertical spatial shift modulated patterns. In addition, the modulation controller 130 may perform horizontal spatial shift modulation by shifting the vertical spatial shift modulated patterns by various numbers of pixels horizontally to obtain horizontal spatial shift modulated patterns. The modulation controller 130 may thus obtain a plurality of patterns corresponding to a number of times that spatial shift modulation is performed, plus the one pattern that was shifted.

The modulation controller 130 may be implemented by at least one processor or may include at least one processor.

The depth scanner 140 performs a depth scan on one spot on a surface of the subject 10 using modulated light received from the spatial light modulator 120. The depth scanner 140 performs the depth scan by transmitting the modulated light received from the spatial light modulator 120 in a depth direction of the subject 10 onto one spot on the surface of the subject 10, and receiving light according to a depth returning to the depth scanner 140 due to transmission, reflection, scattering, etc., of the transmitted light incident on the subject 10. The depth scan is also referred to as an A-scan. In one example, the depth scanner 140 may perform the depth scan using optical coherency.

The depth scanner 140 repeats the depth scan on the same spot on the surface of the subject 10 for each of a plurality of patterns of the spatial light modulator 120.

The depth scanner 140 may be implemented by at least one processor or may include at least one processor. In addition, the depth scanner 140 may be placed in the tomography image generating apparatus 100 as shown in FIG. 1, or may be placed outside the tomography image generating apparatus 100.

The data detector 150 detects depth scan data for each of the plurality of patterns from the light that is obtained by the depth scanner 140 from the depth scan performed by the depth scanner 140 for each of the plurality of patterns of the spatial light modulator 120.

For example, the data detector 150 may detect a spectrum signal that represents an intensity of a signal according to a depth from the light that returns to the depth scanner 140 due to transmission, reflection, scattering, etc., of the transmitted light incident on the subject 10.

The data detector 150 may be implemented by at least one processor or may include at least one processor. In addition, the data detector 150 may be placed in the tomography image generating apparatus as shown in FIG. 1, or may be placed outside the tomography image generating apparatus 100.

In particular, the depth scanner 140 repeats the depth scan for each of the plurality of patterns and the data detector 150 may obtains depth scan data for each of the plurality of patterns through the process described below.

The modulation controller 130 applies a first pattern to the spatial light modulator 120, the depth scanner 140 receives light for the first pattern from one spot on a surface of the subject 10, and the data detector 150 detects depth scan data for the first pattern from the light received by the depth scanner 140.

After the data detector 150 detects the depth scan data for the first pattern, the data detector 150 transmits a control signal to the modulation controller 130 to control the modulation controller 130 to apply a second pattern to the spatial light modulator 120, the depth scanner 140 performs a depth scan on the same spot on the surface of the subject 10 for the second pattern. The data detector 150 detects depth scan data for the second pattern from the light received by the depth scanner 140, and transmits a control signal to the modulation controller 130.

Similarly, the modulation controller 130 sequentially applies a third pattern, a fourth pattern, etc., to the spatial light modulator 120 in response to control signals from the data detector 150, the depth scanner 140 sequentially repeats the depth scan on the same spot on the surface of the subject 10 for each of the applied patterns, and the data detector 150 sequentially detects depth scan data for the plurality of patterns.

The signal processor 160 separates noise components and signal components based on the correlation of signal values of the depth scan data for each of the plurality of patterns, and enhances the signal components. The signal processor 160 may perform a matrix decomposition on a matrix R representing a vector space generated based on the correlation of signal values of the depth scan data for each of the plurality of patterns, and divide the vector space represented as a sum of subspace components into a noise subspace and a signal subspace based on a matrix obtained by the matrix decomposition to separate the noise components and the signal components.

First, the signal processor 160 obtains signal values of depth scan data for each of the plurality of patterns. For example, when m signal values are obtained according to a depth from depth scan data for one pattern, m×n signal values may be obtained for n patterns as represented by Equation 1 below.

$$Y = \begin{bmatrix} y_0^1 & \cdots & y_0^n \\ \vdots & \ddots & \vdots \\ y_m^1 & \cdots & y_m^n \end{bmatrix} \quad (1)$$

In Equation 1, Y represents a set of signal values of depth scan data for each of a plurality of patterns, and $y_m^n$ represents an m-th signal value of depth scan data for an n-th pattern.

The signal value $y_m^n$ of depth scan data is a value that includes an actual signal and noise such as noise due to light scattering. Accordingly, a signal for the depth scan data may be represented by Equation 2 below.

$$y(t)=A \cdot x(t)+n(t) \quad (2)$$

In Equation 2, y(t) represents a signal value of the depth scan data, A represents a point spread function (PSF) of incident light that enters the subject 10, x(t) represents an actual signal, and n(t) represents white noise.

The signal processor 160 attempts to decrease n(t), a noise component, and enhance x(t), an actual signal component, in each signal based on the correlation of signal values of the depth scan data obtained for each of a plurality of patterns.

The signal processor 160 generates a matrix R representing a vector space based on the correlation of signal values of depth scan data for each of a plurality of patterns. For example, the matrix R may be a covariance matrix of signal values of depth scan data for each of a plurality of patterns. However, it will be apparent to one of ordinary skill in the art that the matrix R may be any of various matrices that are based on the correlation of signal values, rather than the covariance matrix. For convenience of explanation, it is assumed below that the matrix R is the covariance matrix.

Accordingly, the signal processor 160 obtains a covariance matrix R with respect to a set of signal values Y of depth scan data for each of a plurality of patterns. The covariance matrix R may be obtained by multiplying a matrix of the set of signal values Y by a conjugate transpose matrix of Y according to Equation 3 below.

$$R = \text{Cov\_Y} = Y \cdot Y^H = \begin{bmatrix} r_0^0 & \cdots & r_0^m \\ \vdots & \ddots & \vdots \\ r_m^0 & \cdots & r_m^m \end{bmatrix} \quad (3)$$

In Equation 3, R represents a covariance matrix, Cov_Y represents a covariance matrix for a set of signal values Y, and $Y^H$ represents the conjugate transpose matrix of Y. When the number of the plurality of patterns is n, m signal values are obtained for each pattern, and m is equal to or greater than n, the covariance matrix R may consist of m×m values. In Equation 3, $r_m^m$ is a signal value of the covariance matrix R and, represents that signal values of the covariance matrix R may consist of m×m values.

When Equation 3 corresponding to a covariance of signal values of depth scan data for a plurality of patterns is modified to represent an actual signal and noise that are included in the signal values of the depth scan data, Equation 4 below is obtained.

$$R_y=A \cdot R_x \cdot A^H+\sigma^2 I \quad (4)$$

In Equation 4, $R_y$ represents a covariance of signal values of depth scan data obtained for a plurality of patterns. $R_y$ may be represented by a signal component $A \cdot R_x \cdot A^H$ and a noise component $\sigma^2 I$. In the signal component $A \cdot R_x \cdot A^H$, $R_x$ represents a covariance between actual signal components that are included in signal values of depth scan data, A represents a PSF of incident light that enters the subject 10, and $A^H$ represents the conjugate transpose matrix of A. In the noise component $\sigma^2 I$, $\sigma^2$ represents a noise variance and/represents an identity matrix.

The signal processor 160 performs a matrix decomposition on the matrix R. For example, the signal processor 160 may decompose the matrix R by performing an eigenvalue decomposition or a singular value decomposition. For convenience of explanation, it is assumed below that the signal processor 160 decomposes the matrix R by performing the singular value decomposition.

The signal processor 160 decomposes the matrix R by performing the singular value decomposition according to Equation 5 below.

$$SVD(R) = \begin{bmatrix} u_0^0 & \cdots & u_0^l \\ \vdots & \ddots & \vdots \\ u_m^0 & \cdots & u_m^l \end{bmatrix} \begin{bmatrix} \lambda_1 & 0 & 0 & 0 \\ 0 & \lambda_2 & 0 & 0 \\ 0 & 0 & \ddots & 0 \\ 0 & 0 & 0 & \lambda_m \end{bmatrix} \begin{bmatrix} v_0^0 & \cdots & v_0^m \\ \vdots & \ddots & \vdots \\ v_z^0 & \cdots & v_z^m \end{bmatrix} \quad (5)$$

In Equation 5, SVD(R) represents a singular value decomposition of the matrix R. The matrix R may be expressed as the product of three matrices as in Equation 5 above. A first matrix includes l×m $u_m^l$ values, and the m columns of the first matrix are called left-singular vectors. A second matrix is a diagonal matrix that includes m×m values, including non-negative $\lambda_m$ values as its diagonal components, and zeroes as its other components. The $\lambda_m$ values are singular values, and thus the second matrix may be called a singular value matrix. A third matrix of includes m×z $v_z^m$ values, and the m columns of the third matrix are called right-singular vectors.

The signal processor 160 divides the vector space represented by the matrix R represented as a sum of subspace components into a noise subspace and a signal subspace based on a matrix obtained by the matrix decomposition of the matrix R.

The signal processor 160 may divide the vector space into the noise subspace and the signal subspace based on a threshold and the matrix obtained by the matrix decomposition. The signal processor 160 may determine a threshold based on the characteristics of subspaces components or noise levels of the signals. The threshold may be a signal-to-noise ratio (SNR) or a noise variance, but is not limited thereto.

For example, the signal processor 160 may decompose the matrix R by performing a singular value decomposition and rank in size order singular values of a singular value matrix obtained by the singular value decomposition. The singular values of the singular value matrix correspond to singular vectors of a singular vector matrix. The signal processor 160 may divide the ranked values based on a predetermined threshold to divide a vector space into a noise subspace and a signal subspace.

For example, the signal processor 160, may rank λ values of the second matrix of Equation 5 (the singular value matrix) in descending order, and divide the ranked values into values larger than a predetermined threshold and values smaller than the threshold. The values larger than the threshold may be signal components and the values smaller than the threshold may be noise components. Accordingly, the signal processor 160 may divide the vector space of the matrix R into a noise subspace and a signal subspace.

For example, when the signal processor 160 ranks λ values in size order, the signal processor 160 may divide the vector space into the signal subspace and the noise subspace as according to Equation 6 below in which $\lambda_1$ to $\lambda_t$ are values larger than the threshold and $\lambda_{t+1}$ to $\lambda_m$ are values smaller than the threshold.

$$R = \boxed{\lambda_1 \cdot [\ \ldots\ ] + \lambda_2 \cdot [\ \ldots\ ] + \ldots + \lambda_t \cdot [\ \ldots\ ]} + \quad (6)$$

$$\boxed{\lambda_{t+1} \cdot [\ \ldots\ ] + \ldots + \lambda_m \cdot [\ \ldots\ ]}$$

As can be seen from Equation 6, the vector space of the matrix R may be represented as a sum of subspace components obtained through the matrix decomposition. The signal processor 160 assigns $\lambda_1$ to $\lambda_t$ of the vector space to the signal subspace, and assigns $\lambda_{t+1}$ to $\lambda_m$ of the vector space to the noise subspace. In order to avoid obscuring the features of this example, components other than singular value components in Equation 6 are expressed as [ . . . ].

In another example, the signal processor 160 may decompose the matrix R by performing an eigenvalue decomposition and rank in size order eigenvalues of an eigenvalue matrix obtained by the eigenvalue decomposition. The eigenvalues of the eigenvalue matrix correspond to eigenvectors of a eigenvector matrix. The signal processor 160 may divide the ranked values based on a predetermined threshold to divide a vector space represented as a sum of subspace components into a noise subspace and a signal subspace.

The signal processor 160 may automatically perform an operation of dividing the vector space into the noise subspace and the signal subspace using a predetermined computer algorithm.

Finally, the signal processor 160 reconstructs a vector space based on either one or both of the components of the signal subspace and the components of the noise subspace.

For example, the signal processor 160 may reconstruct a vector space based only on the components of the signal subspace without the components of the noise subspace. When the vector space of Equation 6 is reconstructed without noise components, Equation 7 below may be obtained.

$$R' = \lambda_1 \cdot [\ldots] + \lambda_2 \cdot [\ldots] + \ldots + \lambda_t \cdot [\ldots] \quad (7)$$

In Equation 7, R' represents a reconstructed vector space. Referring to Equations 6 and 7, the signal processor 160 may remove the components of the noise subspace corresponding to the noise components of $\lambda_{t+1}$ to $\lambda_m$ to reconstruct the vector space based only on the components of the signal subspace.

In another example, the signal processor 160 may reconstruct a vector space based only on the components of a noise subspace. In this example, the signal processor 160 may reconstruct the vector space based on the components of the noise subspace of $\lambda_{t+1}$ to $\lambda_m$ in the vector space of Equation 6 above.

For example, the signal processor 160 may calculate a multiple signal classification (MUSIC) spectrum based on the components of the noise subspace, and reconstruct a vector space based on the calculated MUSIC spectrum.

The signal processor 160 may calculate a MUSIC spectrum according to Equation 8 below.

$$P_{MU} = \frac{1}{\|Q^H A\|_p} \quad (8)$$

In Equation 8, $P_{MU}$ represents the MUSIC spectrum of a vector space, Q represents the components of a noise subspace, $Q^H$ represents the conjugate transpose of the components of the noise subspace, A represents the PSF of the optical system, and p represents a p-norm. Accordingly, the MUSIC spectrum $P_{MU}$ may be obtained by obtaining the p-norm of the product of the conjugate transpose $Q^H$ of the components of the noise subspace and vector A and then obtaining the inverse of the p-norm.

The calculated value of the p-norm is small where there is a signal and is large where there is noise in the MUSIC spectrum. Accordingly, the inverse of the calculated value of the p-norm is large where there is a signal and small where there is noise in the MUSIC spectrum. Accordingly, the signal processor 160 may restore actual signals buried in noise components.

The signal processor 160 may automatically perform an operation of reconstructing a vector space based on either one or both of the components of the signal subspace and the components of the noise subspace using a predetermined computer algorithm.

The signal processor 160 outputs values of the reconstructed vector space corresponding to the result of the signal processing described above to the image generator 170.

The signal processor 160 may be implemented by at least one processor or may include at least one processor. In addition, the signal processor 160 may be placed in the tomography image generating apparatus 100 as shown in FIG. 1, or may be placed outside the tomography image generating apparatus 100.

The image generator 170 generates a tomography image based on the reconstructed vector space. Accordingly, the image generator 170 may obtain a tomography image in which a noise component is decreased and a signal component is enhanced.

The image generator 170 may be implemented by at least one processor or may include at least one processor. In addition, the image generator 170 may be placed in the tomography image generating apparatus 100 as shown in FIG. 1, or may be placed outside the tomography image generating apparatus 100.

In addition, the tomography image generating apparatus 100 may further include a light controller 145. The light controller 145 may horizontally move the location of the spot on the surface of the subject 10 on which the depth scan is performed for each of the plurality of patterns. Accordingly, the depth scanner 140 repeats the depth scan for each of the plurality of patterns of the spatial light modulator 120 on the moved spot, the data detector 150 obtains the depth scan data for each of the plurality of patterns for the moved spot, the signal processor 160 reconstructs a vector space from the depth scan data for the plurality of patterns for the moved spot, and the image generator 170 generates a tomography image corresponding to the moved spot based on the reconstructed vector space.

The image generator 170 sequentially obtains a plurality of tomography images respectively corresponding to a plurality of spots as the tomography image generating apparatus 100 repeats the operations described above as the light controller 145 moves the location of the spot to a plurality of locations. The image generator 170 combines the plurality of tomography images corresponding to the plurality of spots to generate one tomography image of a region of the subject 10 including all of the spots at which the plurality of tomography images were obtained.

As described above, the tomography image generating apparatus 100 may obtain signal values based on a plurality of uncorrelated patterns of the spatial light modulator 120, separate noise components and signal components based on the correlation of the obtained signal values, and reconstruct a vector space based on the separated components to generate a tomography image having decreased noise. Thus, the tomography image generating apparatus 100 may obtain a tomography image having an increased resolution and an increased penetration depth according to an increased signal-to-noise ratio (SNR).

In addition, since the tomography image generating apparatus decreases noise such as speckle noise through the signal processing of the obtained signals without feedback using the spatial light modulator 120, the tomography image generating apparatus may quickly obtain the tomography image.

Figure 2:
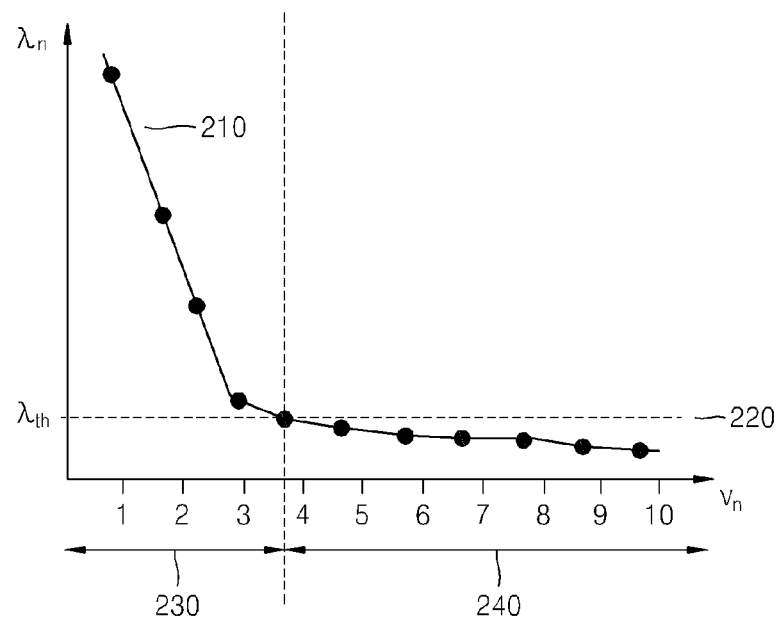
FIG. 2 is a graph illustrating an example of the separation of signal components and noise components based on the correlation of signal values of depth scan data for each of a plurality of patterns performed by a signal processor in FIG. 1.

FIG. 2 is a graph illustrating an example of the separation of signal components and noise components based on the correlation of signal values of depth scan data for each of a plurality of patterns performed by the signal processor in FIG. 1. In FIG. 2, the horizontal axis represents the singular vectors $v_n$, and the vertical axis represents the singular values $\lambda$.

The signal processor 160 decomposes a matrix R generated based on the correlation of signal values of depth scan data for each of a plurality of patterns by performing a singular value decomposition, and ranks in size order singular values of a singular value matrix obtained by the singular value decomposition. The singular values of the singular value matrix correspond to singular vectors of a singular vector matrix.

Although the signal processor 160 decomposes the matrix R by performing the singular value decomposition in the above example, the signal processor may decompose the matrix R by performing another type of matrix decomposition.

In order to help understand the dividing of a vector space into a noise subspace and a signal subspace, the $\lambda$ values ranked in size order may be represented by the solid line 210 in the graph in FIG. 2. The dashed line 220 represents a predetermined threshold $\lambda_{th}$ based on which the vector space is divided into the signal subspace and the noise subspace. Based on the threshold $\lambda_{th}$, the signal processor 160 divides the ranked $\lambda$ values of the singular value matrix into values larger than the threshold and values smaller than the threshold.

The signal processor 160 may determine the predetermined threshold $\lambda_{th}$ based on the characteristics of the components of subspaces or noise levels of the signal values. For example, the signal processor 160 may determine a noise variance as the threshold $\lambda_{th}$. Alternatively, the signal processor 160 may determine a signal-to-noise ratio (SNR) as the threshold $\lambda_{th}$. Accordingly, the vector space may be divided into the signal subspace and the noise subspace.

That is, the signal processor 160 may divide the singular values into values 230 included in the signal subspace and values 240 included in the noise subspace by assigning values larger than the threshold $\lambda_{th}$ to the values 230 included in the signal subspace, and assigning values smaller than the threshold $\lambda_{th}$ to the values 240 included in the noise subspace.

The signal processor 160 may divide the vector space into the signal subspace and the noise subspace using the divided values, and reconstruct the vector space using either one or both of the components of the signal subspace and the components of the noise subspace. The image generator 170 may generate a tomography image based on the reconstructed vector space.

Accordingly, the tomography image generating apparatus 100 may separate noise components and signal components based on the correlation of signal values of depth scan data for each of a plurality of patterns and generate a tomography image in which a signal component is enhanced.

Figure 3:
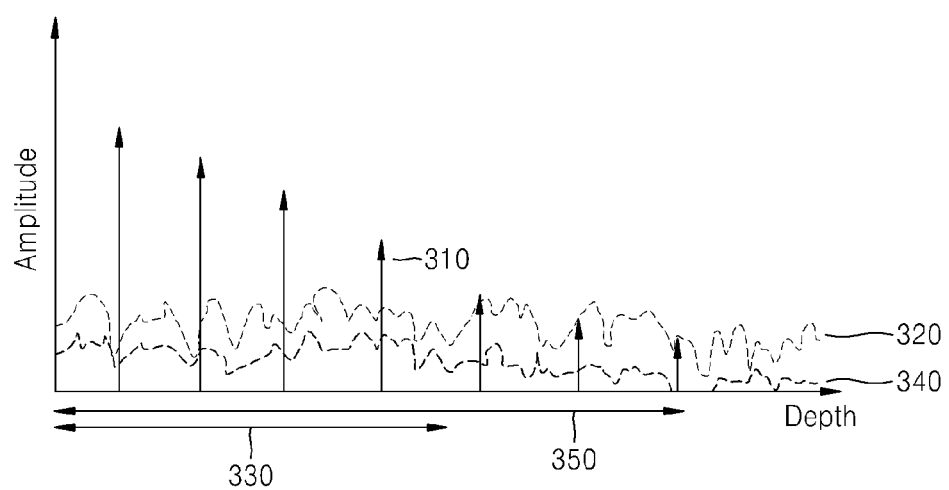
FIG. 3 is a graph illustrating that a tomography image having an increased penetration depth is obtained by generating the tomography image by reconstructing a vector space.

FIG. 3 is a graph illustrating that a tomography image having an increased penetration depth is obtained by generating the tomography image by reconstructing a vector space. In FIG. 3, the horizontal axis represents a depth and the vertical axis represents an amplitude.

A depth scan may be performed by the depth scanner 140 of the tomography image generating apparatus 100 on one spot on the surface of the subject 10, and signal values according to a depth that are obtained by the depth scan may be represented by the graph in FIG. 3.

When the depth scanner 140 transmits light to the surface of the subject 10, noise occurs due to multiple scattering of light that penetrates the subject 10. As a penetration depth increases, an amplitude of a signal obtained by the depth scanner 140 decreases. Thus, when the penetration depth is reaches a specific depth, the amplitude of the signal decreases to the point that the signal cannot be distinguished from noise.

In FIG. 3, a solid line 310 represents a signal. It may be seen that as the penetration depth increases, the amplitude of the solid line 310 decreases. A dashed line 320 in FIG. 3 represents a noise component before the signal processor 160 performs signal processing. Since the amplitude of the signal decreases as the penetration depth increases, if the penetration depth is greater than a specific penetration depth 330, the amplitude of the dashed line 320 is larger than the amplitude of the solid line 310. Accordingly, the signal component cannot be distinguished from the noise component. That is, the signal component is buried in the noise component.

Accordingly, the penetration depth of the subject 10 that may be observed without the signal processor 160 performing signal processing is the penetration depth 330.

A dashed line 340 in FIG. 3 represents a noise component after the signal processor 160 has performed signal processing. The tomography image generating apparatus 100 obtains signal values using a plurality of patterns of the spatial light modulator 120, separates a noise component and a signal component based on the correlation of the signal values, and performs signal processing to enhance the signal component and decrease the amplitude of the noise component as represented by the dashed line 340.

Referring to FIG. 3, the amplitude of the dashed line 340 is greater than the amplitude of the solid line 310 at a penetration depth 350. That is, after the signal processor 160 performs the signal processing, the observable penetration depth of the subject 10 increases from the penetration depth 330 to the penetration depth 350. In addition, since the amplitude of the noise component decreases as a whole as represented by the dashed line 340, the amplitude of the signal relative to the noise is enhanced. Accordingly, the signal processing performed by the signal processor 160 enables the tomography image generating apparatus 100 to recover signals buried in the noise component.

Figure 4:
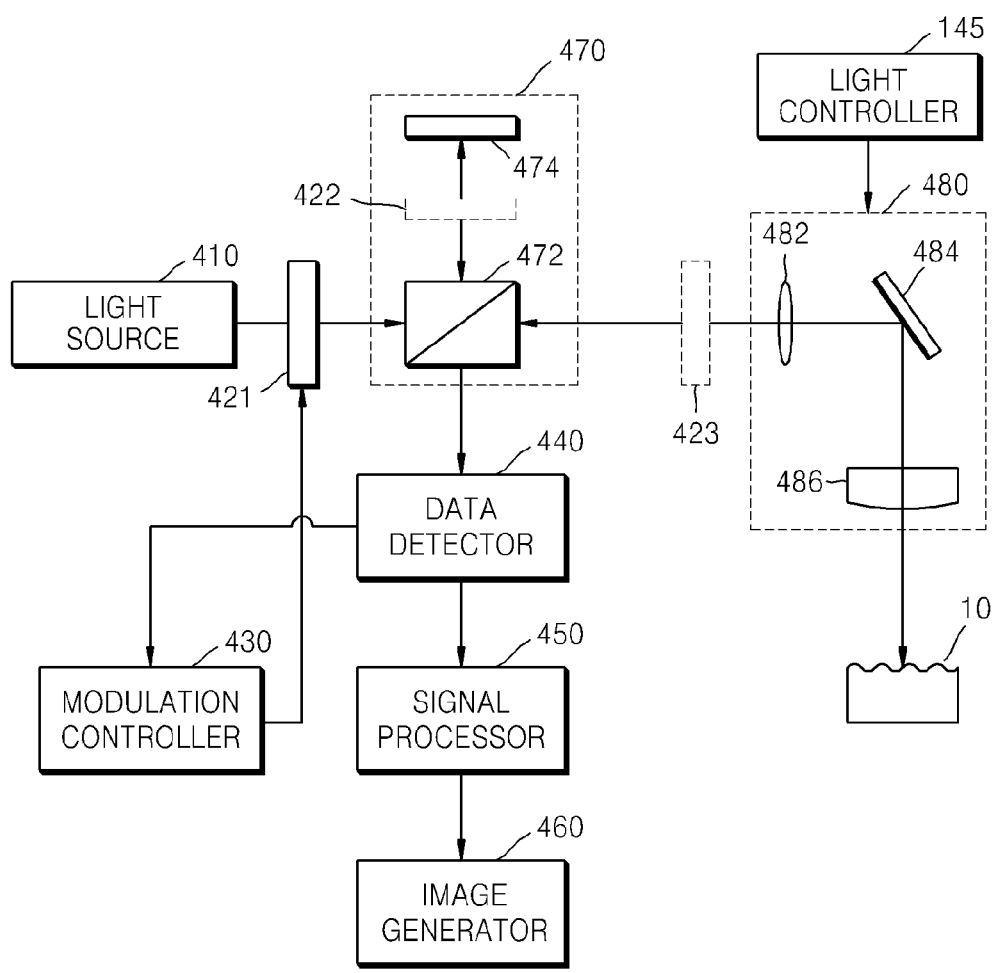
FIG. 4 is a view illustrating an example of an optical coherence tomography apparatus that is an example of the apparatus for generating tomography images illustrated in FIG. 1.

FIG. 4 is a view illustrating an example of an optical coherence tomography apparatus that is an example of the apparatus for generating tomography images illustrated in FIG. 1. Referring to FIG. 4, the optical coherence tomography apparatus 400 includes a light source 410, a spatial light modulator 421, a modulation controller 430, a data detector 440, a signal processor 450, an image generator 460, an interferometer 470, and an optical probe 480. The descriptions of the light source 110, the spatial light modulator 120, the modulation controller 130, the data detector 150, the signal processor 160, and the image generator 170 in FIG. 1 are also applicable to the light source 410, the spatial light modulator 421, the modulation controller 430, the data detector 440, the signal processor 450, and the image generator 460 in FIG. 4, and thus will not be repeated here. Thus, it may be seen that even if repeated below, the description of the tomography image generating apparatus 100 in FIG. 1 and the descriptions of FIGS. 2 and 3 are also applicable to the optical coherence tomography apparatus 400 in FIG. 4.

The optical coherence tomography apparatus 400 illustrated in FIG. 4 includes only components related to this example to avoid obscuring the features of this example. It will be apparent to one of ordinary skill in the art that other components besides the components illustrated in FIG. 4 may also be included in the optical coherence tomography apparatus 400.

The light source 410 emits light. The light emitted from the light source 410 may be wavelength-swept light or laser light, but is not limited thereto. The light emitted from the light source 410 enters the interferometer 470. In the example in FIG. 4, the spatial light modulator 421 is located between the light source 410 and the interferometer 470. Thus, in this example, the light from the light source 410 is modulated by the spatial light modulator 421, and the modulated light from the spatial light modulator enters the interferometer 470.

The spatial light modulator 421 modulates the phase of light according to a pattern. The spatial light modulator 421 may modulate the phase of any one of a measured light, a reference light, and the light emitted from the light source 410. Accordingly, the spatial light modulator 421 may be located at a second location 422 or a third location 423 instead of at the location between the light source 410 and the interferometer 470 as shown in FIG. 4. That is, the spatial light modulator 421 may be located at any one of a location between the light source 410 and the interferometer 470 to modulate the light emitted from the light source 410, a location between a reference mirror 474 and a beam splitter 472 of the interferometer 470 to modulate a reference light, and a location between the beam splitter 472 and the optical probe 480 to modulate a measuring light separated from the beam splitter 472.

The modulation controller 430 sequentially applies each of the plurality of patterns to the spatial light modulator 421.

The interferometer 470 divides the light emitted from the light source 410 into a measuring light and a reference light, directs the measuring light to the subject 10 through the optical probe 480, and receives through the optical probe 480 a response light that is a reflection of the measuring light from the subject 10.

The interferometer 470 includes a beam splitter 472 and a reference mirror 474. The light received from the light source 410 is split into a measuring light and a reference light by the beam splitter 472. The measuring light from the beam splitter 472 enters the optical probe 480, and the reference light is incident on and reflected from the reference mirror 484 and then returns to the beam splitter 472. The measuring light entering the optical probe 480 is directed to the subject 10 whose inner tomography image is captured through the optical probe 480, and the response light that is the reflection of the measuring light from the subject 10 is directed to the beam splitter 472 of the interferometer 470 through the optical probe 480. The response light and the reference light reflected from the reference mirror 474 interfere with each other and generate interference light at the beam splitter 472.

The optical probe 480 includes a collimator lens 482, a galvano scanner 484, and a lens 486. The galvano scanner 484 is a mirror that can be rotated through a given angular range about an axis, and may be implemented as a microelectromechanical system (MEMS) scanner driven by a driving force generated by a MEMS motor. The measuring light received from the interferometer 470 is collimated by the collimator lens 482 of the optical probe 480 and reflected from the galvano scanner 484 so that the traveling direction of the measuring is adjusted and the measuring light is directed to a spot on the surface of the subject 10 after passing through the lens 486.

The depth scanner 140 in FIG. 1 corresponds to the interferometer 470 and the optical probe 480 in FIG. 4. Accordingly, the interferometer 470 and the optical probe 480 perform a depth scan on one spot on the surface of the subject 10 using modulated light received from the spatial light modulator 421, and repeat the depth scan on the same spot for each of a plurality of patterns of the spatial light modulator 421.

The data detector 440 detects an interference signal from the interference light generated by the response light and the reference light at the beam splitter 472, and detects a spectrum signal for each of the plurality of patterns of the spatial light modulator 421 based on the interference signal. The data detector 440 outputs the spectrum signal for each of the plurality of patterns to the signal processor 450. Each time the data detector 440 outputs a spectrum signal for one of the plurality of patterns to the signal processor 450, the data detector 440 transmits a control signal to the modulation controller 430 to control the modulation controller 430 to apply a next pattern of the plurality of patterns to the spatial light modulator 421.

The signal processor 450 generates a matrix R representing a vector space based on the correlation of signal values of depth scan data for each of the plurality of patterns, performs a matrix decomposition on the matrix R, divides the vector space represented as a sum of subspace components into a noise subspace and a signal subspace based on a matrix obtained by the matrix decomposition, and reconstructs a vector space based on either one or both of the components of the signal subspace and the components of the noise subspace.

The image generator 460 generates a tomography image based on the reconstructed vector space.

In addition, the optical coherence tomography apparatus 400 may further include a light controller 145 that horizontally moves the location of the spot on the surface of the subject 10 on which the modulated light from the optical probe 480 is incident. Since the description of the light controller 145 that may be included in the tomography image generating apparatus 100 illustrated in FIG. 1 may also be applied to the light controller 145 that may be included in the optical coherence tomography apparatus 400 illustrated in FIG. 4, the description will not be repeated here.

Accordingly, the optical coherence tomography apparatus 400 obtains signal values based on a plurality of uncorrelated patterns of the spatial light modulator 421, separates noise components and signal components based on the correlation of the signal values, and enhances the signal components. Thus, the optical coherence tomography apparatus 400 increases a signal-to-noise ratio (SNR) and thus a resolution, and generates a tomography image having an increased penetration depth.

Figure 5:
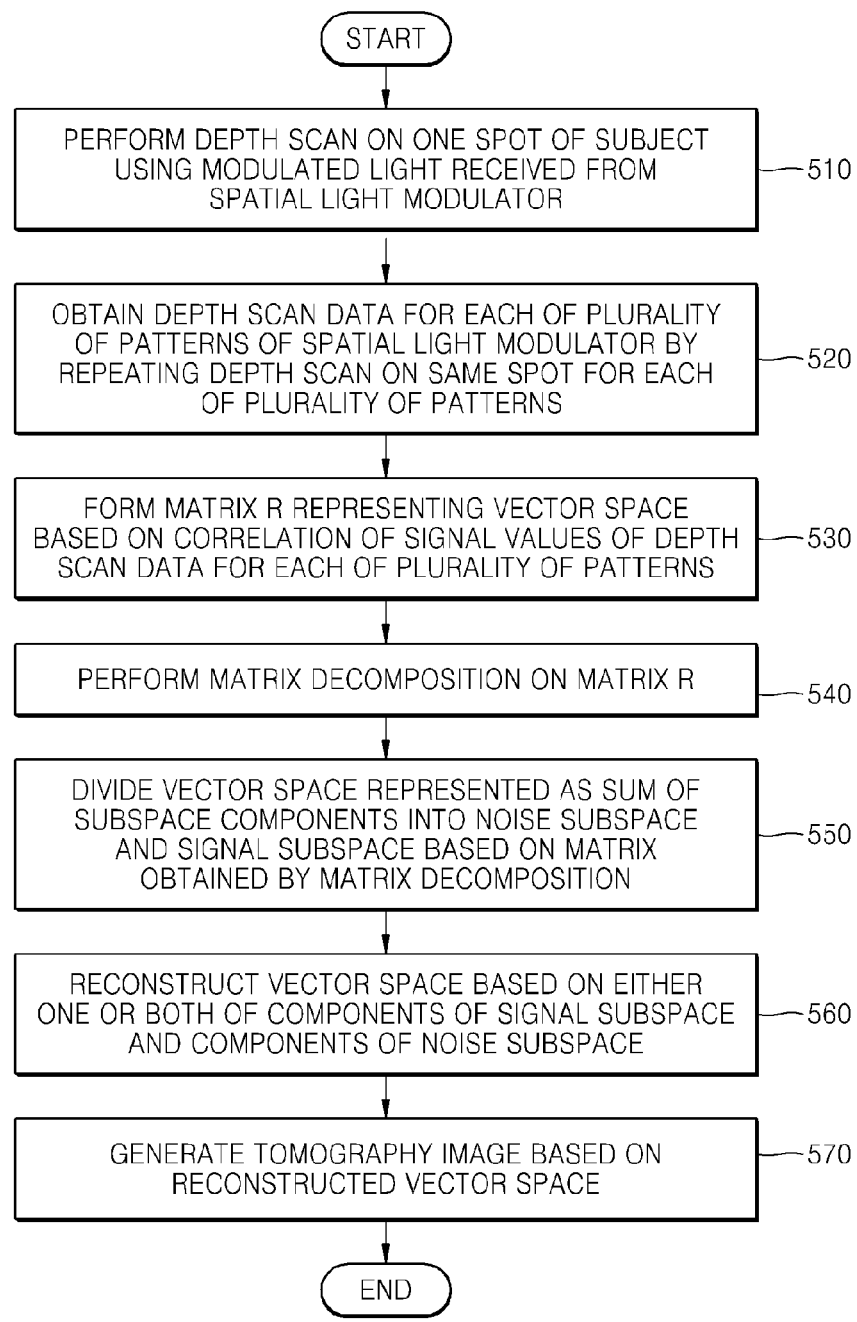
FIG. 5 is a flow chart illustrating an example a method of generating tomography images.

FIG. 5 is a flow chart illustrating an example of a method of generating tomography images. Referring to FIG. 5, the method described in FIG. 5 includes steps that are processed sequentially by the tomography image generating apparatus 100 illustrated in FIG. 1 or the optical coherence tomography apparatus 400 illustrated in FIG. 4. Accordingly, the descriptions provided above of the tomography image generating apparatus 100 illustrated in FIG. 1 and the optical coherence tomography apparatus 400 illustrated in FIG. 4, as well as the descriptions provided above of FIGS. 2 and 3, are also applicable to the method illustrated in FIG. 5.

In operation 510, the depth scanner 140 performs a depth scan on one spot on the surface of the subject using modulated light received from the spatial light modulator 120.

In operation 520, the depth scanner 140 repeats the depth scan for each of a plurality of patterns of the spatial light modulator 120 on the same spot, and the data detector 150 obtains depth scan data for each of the plurality of patterns.

In operation 530, the signal processor 160 forms the matrix R representing a vector space based on the correlation of signal values of the depth scan data for each of the plurality of patterns. For example, the matrix R may be a covariance matrix of signal values of the depth scan data for each of the plurality of patterns.

In operation 540, the signal processor 160 performs a matrix decomposition on the matrix R. For example, the signal processor 160 may decompose the matrix R by performing an eigenvalue decomposition or a singular value decomposition.

In operation 550, the signal processor 160 divides the vector space represented as a sum of subspace components into a noise subspace and a signal based on a matrix obtained by the matrix decomposition. For example, the signal processor 160 may determine a threshold based on the characteristics of subspace components or noise levels of signal values, and divide the vector space into a noise subspace and a signal subspace based on the threshold and the matrix obtained by the matrix decomposition.

In operation 560, a vector space is reconstructed based on either one or both of the components of the signal subspace and the components of the noise subspace. Accordingly, the signal processor 160 may separate noise components and signal components and enhance the signal components, and may thus restore signals buried in noise components.

In operation 570, the image generator 170 generates a tomography image based on the reconstructed vector space. Accordingly, the image generator 170 may generate a tomography image having an increased signal-to-noise ratio (SNR) and an increased penetration depth.

The modulation controller 130, the data detector 150, the signal processor 160, and the image generator 170 in FIG. 1 and the modulation controller 430, the data detector 440, the signal processor 450, and the image generator 460 in FIG. 4 described above that perform the operations illustrated in FIGS. 2, 3, and 5 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made therein without departing from the spirit and scope of the claims and their equivalents. The examples described herein are to be considered in a descriptive sense only, and not for purposes of limitation. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the detailed description.

What is claimed is:

1. A method of generating a tomography image, the method comprising:
    performing a depth scan on one spot on a surface of a subject using modulated light received from a spatial light modulator configured to modulate either one or both an intensity and a phase light received from a light source according to a pattern for each of a plurality of patterns of the spatial light modulator;
    obtaining depth scan data for each of the plurality of patterns of the spatial light modulator by repeating the depth scan on the spot for each of the plurality of patterns of the spatial light modulator;
    forming a matrix R representing a vector space based on a correlation of signal values of the depth scan data for each of the plurality of patterns of the spatial light modulator;
    performing a matrix decomposition on the matrix R;
    dividing the vector space represented as a sum of subspace components into a noise subspace and a signal subspace based on a threshold and a matrix obtained by the matrix decomposition, wherein the threshold is determined based on characteristics of the subspace components or noise levels of the signal values;
    reconstructing a vector space based on either one or both of components of the signal subspace and components of the noise subspace; and
    generating the tomography image based on the reconstructed vector space.

2. The method of claim 1, wherein the dividing of the vector space comprises:
    determining a noise variance or a signal-to-noise ratio (SNR) as the threshold; and
    dividing the vector space into the noise subspace and the signal subspace based on the threshold and the matrix obtained by the matrix decomposition.

3. The method of claim 1, wherein the reconstructing of the vector space comprises reconstructing the vector space based only on the components of the signal subspace.

4. The method of claim 1, wherein the reconstructing of the vector space comprises:
    calculating a multiple signal classification (MUSIC) spectrum based on the components of the noise subspace; and
    reconstructing the vector space based on the calculated MUSIC spectrum.

5. The method of claim 1, wherein the matrix R is a covariance matrix of signal values of the depth scan data for each of the plurality of patterns of the spatial light modulator.

6. The method of claim 1, wherein the performing of the matrix decomposition on the matrix R comprises performing an eigenvalue decomposition or a singular value decomposition on the matrix R.

7. The method of claim 1, wherein the performing of the matrix decomposition on the matrix R comprises performing an eigenvalue decomposition on the matrix R; and
    the dividing of the vector space comprises:
        ranking eigenvalues of an eigenvalue matrix obtained by the eigenvalue decomposition in size order, the eigenvalues of the eigenvalue matrix corresponding to eigenvectors of an eigenvector matrix; and
        dividing the ranked eigenvalues based on the threshold to divide the vector space into the noise subspace and the signal subspace.

8. The method of claim 1, wherein the performing of the matrix decomposition on the matrix R comprises performing a singular value decomposition on the matrix R; and
    the dividing of the vector space comprises:
        ranking singular values of a singular value matrix obtained by the matrix decomposition in size order, the singular values of the singular value matrix corresponding to singular vectors of a singular vector matrix; and
        dividing the ranked singular values based on the threshold to divide the vector space into the noise subspace and the signal subspace.

9. The method of claim 1, wherein the plurality of patterns of the spatial light modulator are uncorrelated with each other.

10. The method of claim 1, wherein the plurality of patterns of the spatial light modulator are determined based on permutations of a Hadamard pattern.

11. The method of claim 1, wherein the spatial light modulator comprises a digital micromirror device (DMD), or a deformable mirror (DM) device, or a Liquid Crystal on Silicon (LCoS) device.

12. The method of claim 1, wherein the method is an optical coherent tomography (OCT) method or an optical coherent microscopy (OCM) method.

13. A non-transitory computer-readable storage medium storing a computer program for controlling a computer to perform the method of claim 1.

14. An apparatus for generating a tomography image, the apparatus comprising:
- a light source configured to emit light;
- a spatial light modulator configured to modulate either one or both of an intensity and a phase of the light emitted from the light source according to a pattern;
- a modulation controller configured to sequentially apply each of a plurality of patterns to the spatial light modulator;
- a depth scanner configured to:
  - perform a depth scan on one spot on a surface of a subject using modulated light received from the spatial light modulator;
  - repeat the depth scan on the spot for each of the plurality of patterns of the spatial light modulator; and
  - obtain light produced by the depth scan for each of the plurality of patterns of the spatial light modulator;
- a data detector configured to detect depth scan data for each of the plurality of patterns of the spatial light modulator from the light produced by the depth scan for each of the plurality of patterns of the spatial light modulator obtained by the depth scanner;
- a signal processor configured to:
  - form a matrix R representing a vector space based on a correlation of signal values of the depth scan data for each of the plurality of patterns of the spatial light modulator;
  - perform a matrix decomposition on the matrix R;
  - divide the vector space represented as a sum of subspace components into a noise subspace and a signal subspace based on a threshold and a matrix obtained by the matrix decomposition, wherein the threshold is determined based on characteristics of the components of the subspace or noise levels of the signal values; and
  - reconstruct a vector space based on either one or both of components of the signal subspace and components of the noise subspace; and
- an image generator configured to generate the tomography image corresponding to the spot based on the reconstructed vector space.

15. The apparatus of claim 14, wherein the signal processor is further configured to:
- determine a noise variance or a signal-to-noise ratio (SNR) as the threshold; and
- divide the vector space into the noise subspace and the signal subspace based on the threshold and the matrix obtained by the matrix decomposition.

16. The apparatus of claim 14, wherein the matrix R is a covariance matrix of signal values of the depth scan data for each of the plurality of patterns of the spatial light modulator.

17. The apparatus of claim 14, wherein the signal processor is further configured to perform an eigenvalue decomposition or a singular value decomposition as the matrix decomposition on the matrix R.

18. The apparatus of claim 14, wherein the signal processor is further configured to:
- calculate a multiple signal classification (MUSIC) spectrum based on components of the noise subspace; and
- reconstruct the vector space based on the calculated MUSIC spectrum.

19. The apparatus of claim 14, wherein the plurality of patterns of the spatial light modulator are uncorrelated with each other.

20. The apparatus of claim 14, further comprising a light controller configured to horizontally move a location of the spot on the surface on the subject on which the depth scan is performed;
- wherein the depth scanner is further configured to repeat the depth scan for each of the plurality of patterns of the spatial light modulator on the moved spot;
- the data detector is further configured to obtain depth scan data for the plurality of patterns of the spatial light modulator for the moved spot;
- the signal processor is further configured to reconstruct a vector space for the moved spot; and
- the image generator is further configured to:
  - generate a tomography image corresponding to the moved spot based on the reconstructed vector space; and
  - generate a final tomography image of a region corresponding to all of the spots at which the depth scan was performed by combining the tomography images corresponding to all of the spots.

21. A method of generating a tomography image, the method comprising:
- generating a reference light and a measuring light from light emitted from a light source;
- modulating any one of the light emitted from the light source, the reference light, and the measuring light with a spatial light modulator configured to modulate either one or both of an intensity and a phase of light according to a pattern for each of a plurality of patterns of the spatial light modulator;
- performing a depth scan on one spot on a surface of a subject by applying the measuring light to the spot and receiving a response light from the spot;
- repeating the depth scan for each of the plurality of patterns of the spatial light modulator;
- obtaining interference light produced by interference of the reference light and the response light;
- obtaining depth scan data for each of the plurality of patterns of the spatial light modulator based on the interference light;
- forming a matrix R representing a vector space based on a correlation of signal values of the depth scan data for each of the plurality of patterns of the spatial light modulator;
- performing a matrix decomposition on the matrix R;
- dividing the vector space represented as a sum of subspace components into a noise subspace and a signal subspace based on a threshold and a matrix obtained by the matrix decomposition, wherein the threshold is determined based on characteristics of the components of the subspace or noise levels of the signal values;
- reconstructing a vector space based on either one or both of components of the signal subspace and components of the noise subspace; and
- generating the tomography image based on the reconstructed vector space.

* * * * *